Aug. 23, 1966　　　　　E. L. STEVENS　　　　　3,268,236
TRAILER
Filed March 5, 1964　　　　　　　　　　　　　2 Sheets-Sheet 1
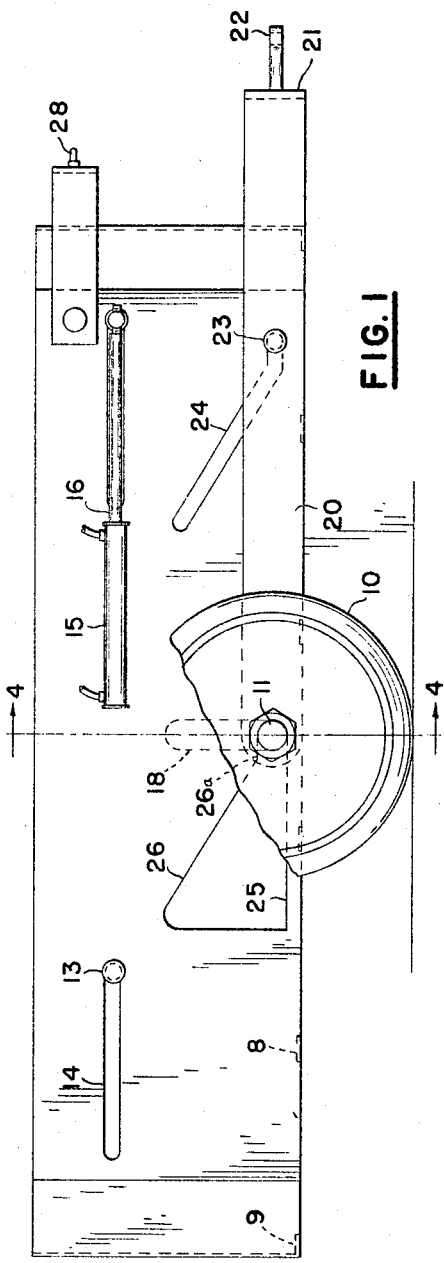
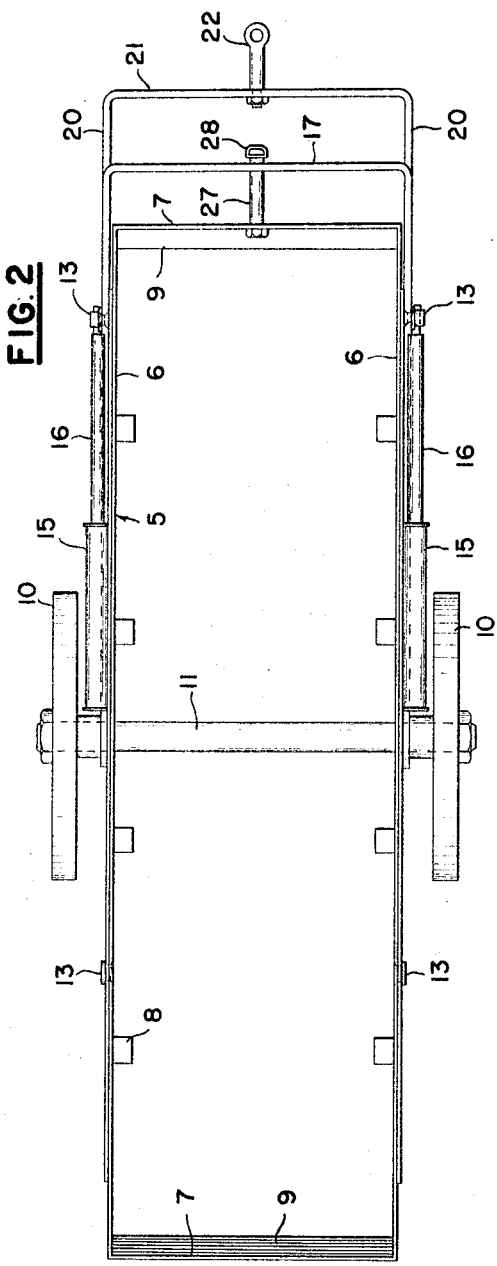
INVENTOR.
EDGAR L. STEVENS
BY
ATTORNEY

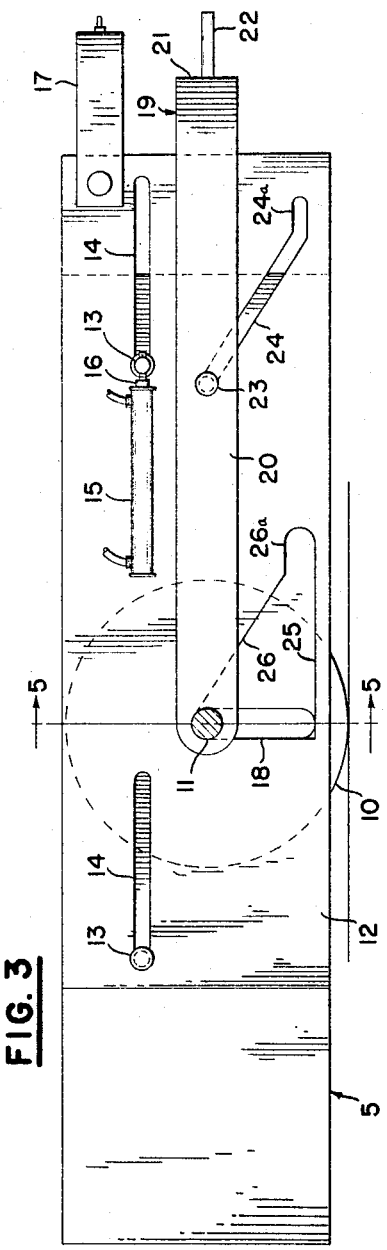
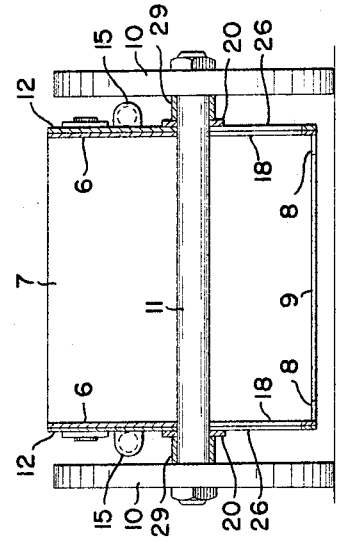
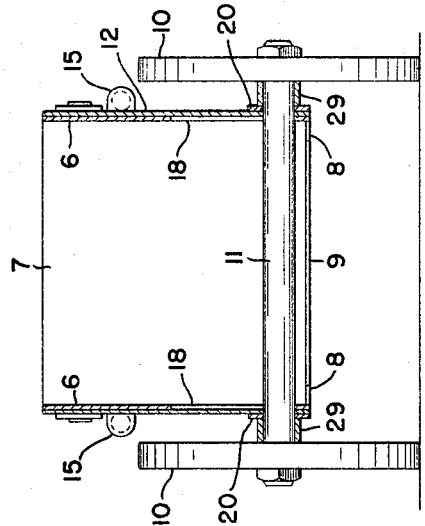

United States Patent Office 3,268,236
Patented August 23, 1966

3,268,236
TRAILER
Edgar L. Stevens, 836 17th Ave., Vero Beach, Fla.
Filed Mar. 5, 1964, Ser. No. 349,711
5 Claims. (Cl. 280—43.23)

This invention relates to a trailer device primarily for use in fruit groves and for hauling boxes of fruit from the grove for removal into a transporting vehicle that is located on a main road.

The invention comprises an elongated trailer that is provided with a pair of ground wheels and with the trailer embodying outer side plates and an elongated body movable between the side plates and means to elevate and lower the body with respect to the side plates, whereby the body is effectively lowered to a position substantially close to the ground and to facilitate the dumping of fruit into boxes supported within the trailer body.

The invention further contemplates a trailer having an elongated rectangular body portion that is disposed between a pair of side plates and with a pair of ground wheels intermediate the length of the body portion that is connected by a U-shape frame member upon which an axle of the wheels is journaled and with the U-shape frame member being provided with a hitch device for connection with a tractor for movement of the trailer through the grove and with means formed upon the side plates and connected to the U-shape frame that causes the body portion to rise when pressure is exerted upon the hitch device and whereby the body portion after being loaded, is caused to be elevated to a position of clearance above the ground and so that the trailer may be easily moved by the tractor to a point outwardly of the grove for unloading.

The invention further contemplates a raising and lowering means for the body of the trailer that comprises diagonal slots formed within the side plates and that are coupled to the U-shaped frame and guide slots also formed in the side plates in a horizontal manner that receive guide pins carried by the trailer body and whereby the trailer body and the side plates are biased upwardly to cause the trailer body and the side plates to rise and fall to and from a ground level by pressure exerted upon the hitch and also hydraulic means for shifting the body with respect to the side plates for causing an elevating movement of the body and the side plates with respect to the U-shape frame.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a side elevation of a trailer constructed in accordance with the invention and shown in an elevated position, FIGURE 2 is a plan view thereof, FIGURE 3 is a side elevational view of the trailer in the lowered or loading position, FIGURE 4 is a transverse section taken substantially on line 4—4 of FIGURE 1, and FIGURE 5 is a transverse section taken substantially on line 5—5 of FIGURE 3.

Referring specifically to the drawings, there is provided a rectangular box-like body 5 having side walls 6 and end walls 7. The body 5 is provided with tongues 8 and cross supports 9 for the resting support of the usual fruit boxes employed in a fruit grove that are to be loaded by fruit pickers who usually pick the fruit in shoulder supported bags and then dump the bags into the boxes that are disposed within the body 5 of the trailer.

The trailer is supported by a pair of ground wheels 10, rotatable upon a shaft or axle 11. Operable upon the outer sides of the body 5 are a pair of side plates 12. The side plates are equal in height to the body 5 and are guided in parallel relation to the body 5 by pins 13, operating in slots 14 formed in the side plates and whereby the side plates are slidably connected with respect to the body. To facilitate the movement of the body 5 with respect to the side plates, there is provided a hydraulic cylinder 15, having a piston rod 16, engaging the forward pair of pins 13. The cylinder 15 is fixed to the outer sides of the plates 12 and the pins 13 are fixed to the body 5 and project through the slots 14. It will therefore be obvious, that when pressure is applied to the cylinder 15, its piston and piston rod 16 will shift the pins 13 along the slots 14 and cause the body to move in a parallel direction to the plates 12. The plates 12 at their forward ends are connected together by a U-shape frame member 17 and whereby the plates 12 are held against outward springing action with respect to the body 5.

The body 5 upon its opposite side walls is slotted at 18 and with the axle 11 passing through the slots 18 and permitting the body 5 and its plates 12 to rise and fall with respect to the shaft 11 and its ground wheels 10.

Overlying the side plates 12, is a rigid U-shape frame member 19 constituting a yoke and having side leg portions 20 and a cross head 21. The legs 20 at their terminal portions are apertured to form a journal for the shaft 11 upon opposite sides of the device. The cross head 21 is provided with any desirable hitch device 22, whereby the machine may be attached to a tractor as a source of motive power to move the device upon the wheels 11.

Means are provided to cause the body 5 and the side plates 12 to shift in a vertical direction with respect to the frame legs 20, such means embodying pins 23, carried by the opposite legs 20 for these pins engage diagonal slots 24 formed in the plates 12, and also the plates 12 are provided with enlarged openings 25 that extend from the slots 18 and have upper diagonal walls 26. The diagonal walls 26 and the slots 24 extend downwardly and are offset at their lower ends as indicated at 24a and 26a and whereby the body, when elevated may have the pins 23 and the axle 11 disposed in the offset to prevent accidental lowering of the body and the side plates when the device is transported by the tractor. The pins 23 extend through the slots 24 of the plates 12 and are fixed to the sides of the body 5. The body 5 and the side plates 12 are preferably formed of any suitable gauge sheet metal and of such thickness that numerous boxes of fruit may be transported in the body without causing the body to flex.

In the use of the device, as shown in FIGURE 3, the body 5 and the plates 12 are in the lowered position with the shaft 11 at the upper end of the slot 18 and the pins 23 at the upper ends of the slots 24. Since the body 5 and the plates 12 are shiftable longitudinally with respect to each other by the slots 14 and the pins 13, it follows that when the pressure is applied to the cylinders 15, the forward pins 13 will traverse the slots 14 and cause the body 5 to shift forwardly within the plates 12. Such forward shifting of the body causes the pins 23 to ride downwardly through the diagonal slots 24 and also causing the shaft 11 to ride upon the diagonal surface 26, causing the body 5 and the plates 12 to rise upwardly upon the ground wheels 10, such action disposes the trailer in an elevated position as illustrated in FIGURE 1. The pins 23 permit the frame 19 to pivot thereon but, when the trailer is attached to the hitch 22, the frame will partake of a horizontal position. With the body elevated with its very considerable load, it is transported through the grove and to a communicating roadway where the boxes of fruit are removed and placed upon a flat bed truck. The hydraulic cylinders 15 may be actuated in any desirable manner by a suitable compressor unit either carried by the trailer itself or connected to a hydraulic unit that may be manually controlled. The brace frame member 17 may carry a rod 27, fixed to the end walls 7 and extending through the brace 17 and provide with a handle 28, whereby the body may be manually shifted with respect to the side plates 12 to bring the body to the lowered position of FIG. 3. While in this lowered position the relationship of the body and side plates will not change until the pins 13 are shifted in their respective slots by the operation of the hydraulic means 15. The axle 11 outwardly of the side plates 12 and the legs 20, may be provided with sleeves 29 that accurately space the wheels 10 from the sides of the trailer.

It will be apparent from the foregoing that a very novel type of trailer has been provided for a specific purpose. In fruit groves, such as orange groves, the space between the trees is so limited that it is not possible to drive a truck therebetween and it becomes necessary that the trailer of this application be employed to permit the pickers to dump their bags into the boxes when the trailer is at a low level, since the bags of fruit are extremely heavy and a truck or trailer of normal height would require that the pickers elevate the bags of fruit substantially above their heads before dumping. With the trailer in the lowered position, as shown in FIGURE 3, the pickers with their loaded bags move with the side of the trailer and with little effort are able to dump their bags of fruit into the boxes carried within the body 5. The structure is relatively simple, is quite cheap to manufacture and most effective for collecting fruit in a grove for movement progressively between the trees and then to be transported outwardly to a communicating road where the boxes are removed from the body and empty boxes are replaced.

It is to be understood that the invention is not limited to the precise construction shown, but that changes are contemplated as readily fall within the spirit of the invention as shall be determined by the scope of the subjoined claims.

I claim:

1. A trailer having a body provided with side walls, a plate disposed against and facially overlying each of the side walls, an axle extending across the body, wheels carried on the axle, the side walls each having a slot opening through which the axle extends and which permits the body to have a raising or lowering movement with respect to said axle, each of the plates having a cam-shaped opening through which the axle extends, said cam-shaped openings causing the body to be raised or lowered upon longitudinal movement of the body relatively to the plates, each of the plates having an inclined guide slot, a pin on each of the side walls of the body entering through the inclined guide slots, the plates having longitudinal guide slots, pins on the side walls of the body extending through the longitudinal guide slots, and hydraulic means operable on at least some of the latter pins to cause longitudinal shift of the body relatively to the plates while also causing raising of the body and the plates therewith.

2. A trailer of the character described comprising, a U-shaped frame member consisting of a pair of parallel arms connected by a head portion, the parallel arms at their extremities being journalled to support an axle, ground wheels supported on the axle, side plates disposed within the frame, an elongated vehicle body located between the side plates, the body being longitudinally shiftable with respect to the side plates, the body having side walls provided with vertical slots through which the axle extends, the side plates having openings provided with inclined edges, the axle extending through such openings, means for longitudinally shifting the body relatively to the side plates whereby the axle, engaging in the slots and also in the openings will cause simultaneous elevation of the body and side plates when the body is longitudinally shifted relatively to the side plates.

3. A trailer of the character decribed comprising, a vehicle body having side walls, an axle extending across the body, wheels carried by the axle, a side plate on each side of the body, the body being shiftable longitudinally relatively to the side plates, the side plates having longitudinal slots, pins on the body extending through and being guided by the slots, the side walls of the body having vertical slots, the plates having triangulated openings registering with said vertical slots, the axle extending through the vertical slots and through the triangulated openings, so that when the body is moved in one direction relatively to the side plates, said body and side plates will be simultaneously elevated to raise the body and the plates for an increased distance above the ground.

4. A trailer according to claim 3, wherein a yoke is attached to the axle and extends forwardly of the body, the plates having inclined slots, pins projecting from the body and passing through said inclined slots, said pins engaging the yoke, said diagonal slots each having a lower horizontal extension into which the pins enter when the body is in a raised position, and the triangulated openings also having a longitudinal extension into which the axle enters when the body and side plates are in a raised position.

5. A trailer of the character described for use as a transporting means for boxes of fruit comprising an elongated body portion open at its top and having parallel side walls and parallel end walls, the body holding a plurality of fruit boxes to be loaded in the grove, a pair of plates disposed upon the outer side walls of the body portion, the plates being each provided with a pair of horizontal slots, pins carried by the side walls of the body portion and extending through and traversing the slots whereby the body portion and the plates are slidable relative to each other, hydraulic cylinders mounted upon the outer sides of the plates and connected with certain of the pins to cause the body portion to slide longitudinally with respect to the side plates, the said pins preventing displacement of the side plates therefrom, the side walls of the body portion being vertically slotted for the passage of an axle, a U-shape frame member having a head portion and a pair of elongated leg portions, the leg portions overlying the side plates, the legs at their end portions being journaled to receive the axle, ground wheels rotatable upon the axle said wheels being disposed outwardly of the legs, the head portion having a hitch for connection to a power unit, the plates intermediate their length being provided with triangular openings having a vertical edge portion, a horizontal edge portion and a diagonal edge portion, the triangular opening receiving the axle and permitting the axle to rise and fall with respect to the body portion and plates and to also traverse the diagonal edge portion for elevating movement of the body portion and the plates with respect to the axle and the wheels, each of the plates adjacent their forward ends also being provided with diagonal slots that are parallel with the diagonal edge of the triangular opening, pins fixed to the leg portions and extending into the diagonal slots and with the pins traversing the slots while the axle traverses the diagonal edge of the triangular opening and causing the body portion and the plates to be elevated and lowered, each of the forward diagonal slots, the diagonal edge of the triangular opening and the horizontal edge of the diagonal opening being extended forwardly in a horizontal plane to receive the axle and the pins of the arms to prevent accidental shifting when the body and the side plates are elevated, the axle and the pins of the arms disposed in the upper ends of the slots and the openings and limiting the downward movement of the body and the plates to a position substantially adjacent to the ground and to facilitate the loading of the boxes disposed within the body portion.

References Cited by the Examiner

UNITED STATES PATENTS

| | | | |
|---|---|---|---|
| 1,383,381 | 7/1921 | Borst | 280—43 X |
| 2,402,027 | 6/1946 | Crowther | 74—110 |
| 2,452,267 | 10/1948 | Schramm | 280—6 |
| 2,453,388 | 11/1948 | Schramm | 280—43.18 |

FOREIGN PATENTS

| | | |
|---|---|---|
| 1,024,360 | 4/1953 | France. |
| 1,038,936 | 9/1958 | Germany. |
| 107,283 | 1916 | Great Britain. |

BENJAMIN HERSH, *Primary Examiner.*

C. C. PARSONS, *Assistant Examiner.*